United States Patent
Yang et al.

(10) Patent No.: US 10,291,152 B2
(45) Date of Patent: May 14, 2019

(54) TRIBOELECTRIFICATION DEVICE AND DISPLAY DEVICE

(71) Applicant: BOE TECHNOLOGY GROUP CO., LTD., Beijing (CN)

(72) Inventors: Tian Yang, Beijing (CN); Jifeng Tan, Beijing (CN); Yanbing Wu, Beijing (CN); Chunyan Ji, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 302 days.

(21) Appl. No.: 15/126,965

(22) PCT Filed: Aug. 26, 2015

(86) PCT No.: PCT/CN2015/088093
§ 371 (c)(1),
(2) Date: Sep. 16, 2016

(87) PCT Pub. No.: WO2016/145786
PCT Pub. Date: Sep. 22, 2016

(65) Prior Publication Data
US 2017/0099016 A1    Apr. 6, 2017

(30) Foreign Application Priority Data
Mar. 19, 2015    (CN) .......................... 2015 1 0122701

(51) Int. Cl.
*H02N 1/04* (2006.01)
*G02F 1/1333* (2006.01)

(52) U.S. Cl.
CPC ............. *H02N 1/04* (2013.01); *G02F 1/1333* (2013.01); *G02F 2203/68* (2013.01)

(58) Field of Classification Search
CPC ...... H02N 1/04; G02F 2203/68; G02F 1/1333
(Continued)

(56) References Cited

U.S. PATENT DOCUMENTS 8,536,760 B1 *  9/2013  Kim .................... H02N 11/002
                                                  310/309
10,025,139 B2 *  7/2018  Kang ................ G02F 1/133617
(Continued)

FOREIGN PATENT DOCUMENTS

CN        202948675 U     5/2013
CN        203057022 U     7/2013
(Continued)

OTHER PUBLICATIONS

International Search Report and Written Opinion (including English translation of Box V) dated Dec. 18, 2015, for corresponding PCT Application No. PCT/CN2015/088093.
(Continued)

*Primary Examiner* — Forrest M Phillips
(74) *Attorney, Agent, or Firm* — Kinney & Lange, P.A.

(57) ABSTRACT

Embodiments of the present invention disclose a triboelectrification device and a display device. The triboelectrification device includes at least one layered electricity generating assembly that is stacked, the at least one layered electricity generating assembly each comprising an electrode layer, an insulating layer, a metal layer and an elastomer; the electrode layer, the insulating layer, and the metal layer are arranged in sequence from above downwards, the elastomer is disposed between the electrode layer and the metal layer and is located at at least one side of the insulating layer. The electrode layer and the insulating layer are brought into contact with each other to be rubbed against each other by applying a pressure to the electrode layer, and the electrode layer and the insulating layer can be separated from each other by springing back of the elastomer, such that the electrode layer and the insulating layer are repeatedly brought into contact with each other to be rubbed against each other time after time, thereby continually generating positive and negative charges on the metal layer and the
(Continued)

electrode layer respectively and thus achieving usage of electric energy into which energy generated by friction is converted.

17 Claims, 2 Drawing Sheets

(58) Field of Classification Search
USPC .......................................................... 310/310
See application file for complete search history.

(56) References Cited

U.S. PATENT DOCUMENTS

| | | | | |
|---|---|---|---|---|
| 2015/0061464 | A1* | 3/2015 | Park | H01L 41/113 |
| | | | | 310/329 |
| 2015/0318800 | A1* | 11/2015 | Zhang | H02N 1/04 |
| | | | | 310/310 |
| 2016/0065091 | A1* | 3/2016 | Wang | H02N 1/04 |
| | | | | 310/300 |
| 2018/0145244 | A1* | 5/2018 | Otagiri | G01L 5/226 |

FOREIGN PATENT DOCUMENTS

| | | |
|---|---|---|
| CN | 103368450 A | 10/2013 |
| CN | 103368458 A | 10/2013 |
| CN | 103411710 A | 11/2013 |
| CN | 203301397 U | 11/2013 |
| CN | 103684035 A | 3/2014 |
| CN | 103780137 A | 5/2014 |
| CN | 104076084 A | 10/2014 |
| CN | 104167950 A | 11/2014 |
| CN | 104242723 A | 12/2014 |
| CN | 104682768 A | 6/2015 |
| JP | 01136574 A * | 5/1989 |

OTHER PUBLICATIONS

First Chinese Office Action dated May 25, 2016 for corresponding Chinese Application No. 201510122701.7.

* cited by examiner

TRIBOELECTRIFICATION DEVICE AND DISPLAY DEVICE

CROSS-REFERENCE TO RELATED APPLICATIONS

This application is a Section 371 National Stage Application of International Application No. PCT/CN2015/088093, filed Aug. 26, 2015, entitled "Triboelectrification device and display device", which is incorporated herein by reference in their entirety.

BACKGROUND

1. Technical Field

The present invention relates to field of liquid crystal display and particularly to a triboelectrification device and a display device.

2. Description of the Related Art

Friction is a common phenomenon and exists in various aspects of our daily lift. When rubbing, energy is generated. If the energy generated by rubbing can be converted into energy that can be used, our lift will be affected by this way.

Currently, the energy generated by rubbing is still hard to be collected to be used. Further, in prior art, there is a lack of a device that can convert the energy generated by rubbing and the energy generated by rubbing in daily life thus cannot be reasonably used.

SUMMARY

In order to effectively convert and use the energy generated by rubbing in daily life, embodiments of the present invention provide a triboelectrification device and a display device.

According to an aspect of the present invention, there is provided a triboelectrification device comprising at least one layered electricity generating assembly that is stacked, the at least one layered electricity generating assembly each comprising an electrode layer, an insulating layer, a metal layer and an elastomer;

the electrode layer, the insulating layer, and the metal layer are arranged in sequence from above downwards, the insulating layer is in contact with the metal layer, the elastomer is disposed between the electrode layer and the metal layer and the elastomer is located at at least one side of the insulating layer.

According to an aspect of the present invention, there is provided a display device comprising a triboelectrification device, a display panel body and a power supply, the triboelectrification device being arranged at a side of the display panel body and the triboelectrification device, the power supply and the display panel body are electrically connected in sequence.

BRIEF DESCRIPTION OF THE DRAWINGS

In order to more clearly indicate the technical schemes in embodiments of the present invention, the drawings that are used to illustrate the embodiments will be described simply. Obviously, the drawings in the following content are merely some embodiments of the present invention. However, it is obvious for those skilled in the art to obtain other drawings based on the disclosed drawings without inventive labor.

Figure 1:
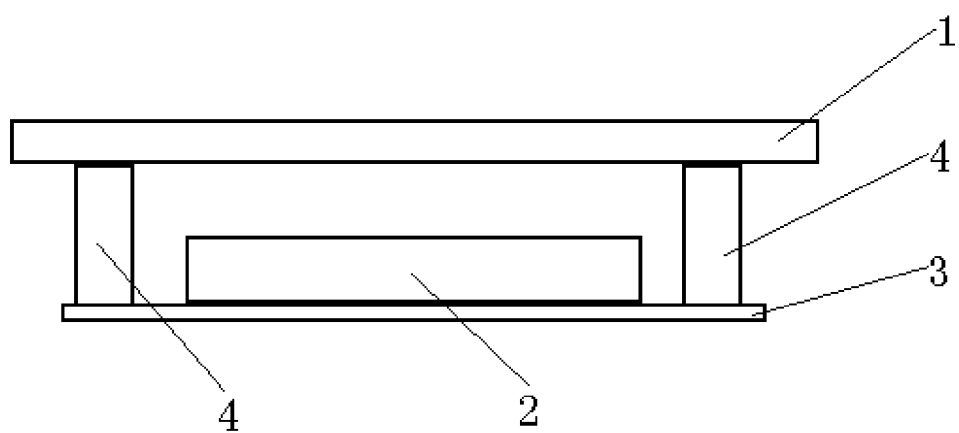
FIG. 1 is a schematic view of a triboelectrification device according to an embodiment of the present invention.

In the drawings, 1, electrode layer, 2, insulating layer, 3, metal layer, 4, elasismer, 5, insulating separation layer, 51, balance weight, 52, insulating housing, 6, triboelectrification device, 7, display panel body, 8, power supply, 81, connection component, 82, voltage dropping and regulating circuit, and 83, battery.

DETAILED DESCRIPTION OF THE EMBODIMENTS

In order to make objection, technical scheme and advantages of the disclosure clearer, description in detailed of embodiments of the present invention will be made with reference to the drawings.

As shown in FIG. 1, embodiments of the present invention provide a triboelectrification device, comprising at least one layered electricity generating assembly that is stacked, the at least one layered electricity generating assembly each comprising an electrode layer 1, an insulating layer 2, a metal layer 3 and an elastomer 4;

the electrode layer 1, the insulating layer 2, and the metal layer 3 are arranged in sequence from above downwards, the insulating layer 2 is in contact with the metal layer 3, the elastomer 4 is supported between the electrode layer 1 and the metal layer 3 and the elastomer 4 is located at at least one side of the insulating layer 2.

In an embodiment of the present invention, the elastomer 4 connects the electrode layer 1 with the metal layer 3 and is configured to be supported between the electrode layer 1 and the metal layer 3; the insulating layer 2 is disposed in a space between the electrode layer 1 and the metal layer 3. The elastomer 4 and the insulating layer 2 may be separated from each other and will not be brought into contact with each other even though the triboelectrification device is deformed. The elastomer 4 may be located at only one side or both sides of the insulating layer 2, or, may be configured to surround the insulating layer 2 and support the electrode layer 1 and the metal layer 3.

Preferably, in a non-working state of the triboelectrification device, the elastomer 4 has a height such that a top face of the elastomer 4 is at a slightly higher level than a top face of the insulating layer 2, so that the electrode layer 1 is not in contact with the insulating layer 2; in a working state of the triboelectrification device, the electrode layer 1 is pressed such that the elastomer 4 is thus compressed so that the electrode layer 1 and the insulating layer 2 are brought into contact with each other and are rubbed against each other; when a pressure on the electrode layer 1 is removed, the elastomer 4 springs back such that the electrode layer 1 is separated from the insulating layer 2 again. When this process is repeated, the electrode layer 1 and the insulating layer 2 can be repeatedly brought into contact with each other many times to be rubbed against each other. As a result, positive charges and negative charges are continually generated on the metal layer 3 that is in contact with the insulating layer 2 and the electrode layer 1 respectively. The positive and negative charges can be directly led out to be used as an energy source, through wires connected to the metal layer 3 and the electrode layer 1. In this way, the energy generated by rubbing is converted into electric energy, avoiding energy waste. The device according to the embodiments of the present invention has a simplified structure and reduced production cost.

In an embodiment of the present invention, in order to improve energy conversion efficiency, a plurality of layered electricity generating assemblies that are stacked may be provided. The stacking manner is not limited herein. In principle, the plurality of layered electricity generating assemblies are connected in series such that charges from each of the plurality of layered electricity generating assemblies are led out and collected to achieve accumulation of charges and increased energy conversion efficiency.

In an embodiment, the elastomer 4 is made of elastic resin material.

In an embodiment, the elastomer 4 is a photoresist material.

In an embodiment, the elastomer 4 is made of elastic resin material, and preferably photoresist material. In actual production of a liquid crystal panel, generally, photoresist is often used for manufacturing a liquid crystal display. The elastic resin material such as the photoresist material is adopted in the embodiment. Therefore, original production equipment may be directly used without introducing new equipment so that a liquid crystal panel manufacturing line may be directly used to produce the device in quantities, thereby achieving a convenient production and a low production cost.

In an embodiment, the photoresist material includes 50%~90% solvent, 5%~20% monomer, 0.1%~2% dispersant and 0.1%~5% initiator.

In an embodiment of the present invention, ether substance or ester substance is used as the solvent; and acrylate substance may be selected as the monomer. With the above percentage, the photoresist as made has a good elasticity and can spring back in time after being deformed by being pressed, obtaining a good effect.

Further, the photoresist material further includes at least one of an acrylic particle and an inorganic filler particle.

In an embodiments of the present invention, the inorganic filler particle is a particle of calcium carbonate with a particle size of 1~11 μm, a particle of superfine ceramic with a particle size of 0.09 μm or a silicon ball with a particle size of 3~10 μm.

According to an embodiment of the present invention, a common photoresist has an increased coefficient of elasticity and toughness by adding at least one of the acrylic particle and the inorganic filler particle into the common photoresist, to facilitate occurrence of shear yield of the photoresist under a pressure force so as to absorb lots of plastic deformation energy. The photoresist generally has a coefficient of deformation which can reach 10~15% under a pressure force and a coefficient of resilience which can reach more than 95%. An advantage in actual use is apparent.

Figure 2:
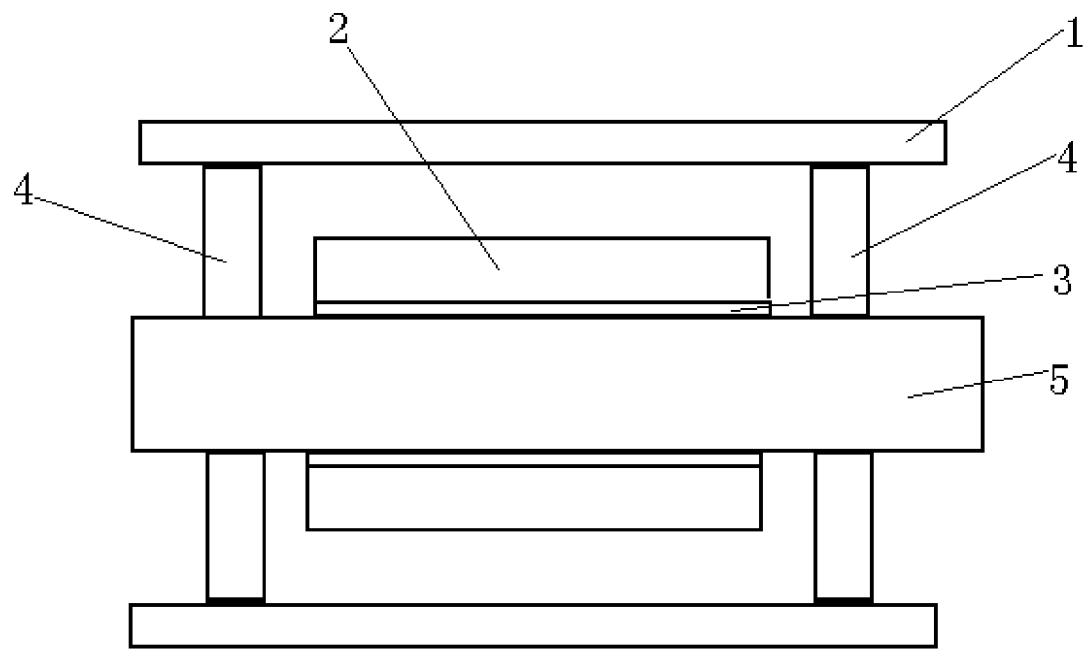
FIG. 2 is a schematic view of a triboelectrification device according to an another embodiment of the present invention.

In another embodiment of the present invention as shown in FIG. 2, in addition to the electricity generating assembly including the electrode layer 1, the insulating layer 2, the metal layer 3 and the elastomer 4, the triboelectrification device further includes an insulating separation layer 5. The insulating separation layer 5 is provided between every two layered electricity generating assemblies that are stacked.

In order to increase the energy conversion efficiency of the triboelectrification device, a plurality of layered electricity generating assemblies that are stacked may be provided and charges from each of them are led out and collected, achieving energy conversion. In the embodiment of the present invention, two layered electricity generating assemblies are provided to be stacked, and the stacking manner of them is not limited. In the embodiment, a second layered electricity generating assembly is reversely placed opposite to a first layered electricity generating assembly, that is, the metal layers 3 in the two layered electricity generating assemblies are placed close to each other and the insulating separation layer 5 is additionally provided between two metal layers 3 so as to separate the insulating layers 2 of the two electricity generating assemblies from each other, reduce electrostatic adsorbability between the two insulating layers 2 due to friction and avoid degradation of triboelectrification performance due to electrostatic adsorption after rubbing.

In the embodiment, position of the elastomer 4 may be flexibly adjusted and arranged. The elastomer 4 may be arranged between the insulating separation layer 5 and the electrode layer 1. In this case, the elastomer 4 can also support the electrode layer 1 and the electrode layer 1 can also spring back. And, the metal layer 3 is reduced in size as long as the charges generated from the insulating layer 2 can be conducted and collected, so as to greatly save material and reduce cost.

Figure 3:
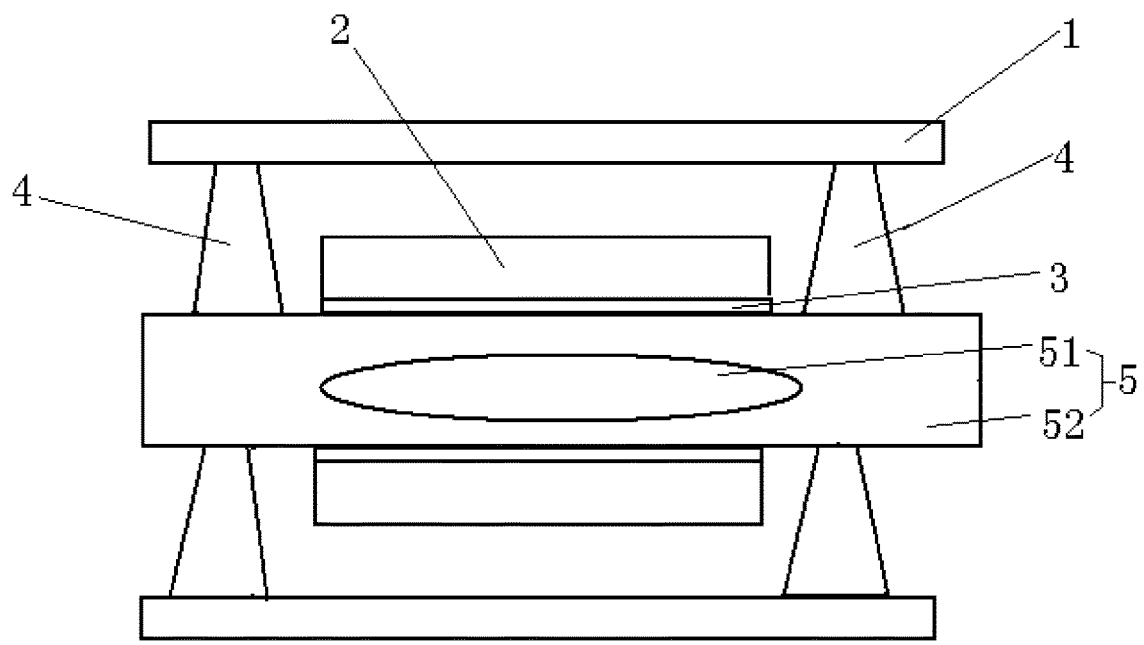
FIG. 3 is a schematic view of a triboelectrification device according to a further embodiment of the present invention.

As shown in FIG. 3, in an embodiment, the insulating separation layer 5 includes an insulating housing 52 and a balance weight 51 that is disposed within the insulating housing 52.

In the embodiment of the present invention, the insulating separation layer 5 is provided and is configured such that the balance weight 51 is wrapped within the insulating housing 52. The balance weight is preferably a metal block. With the above configuration, the insulating separation layer 5 itself can be increased in weight and inertia due to addition of the balance weight 51 while separating an upper layer of an electricity generating assembly from a lower layer of an electricity generating assembly. With this configuration, as for a triboelectrification device according to the embodiment of the present invention that includes a plurality of layered electricity generating assemblies, the triboelectrification device may be directly shaken or wobbled. Due to existence of the balance weight 51, the balance weight 51 is shaken or wobbled together with the triboelectrification device due to its inertia and thus can directly press the metal layer 3 that is in contact with the insulating separation layer 5 or the electrode layer 1. By deforming the elastomer 4, the electrode layer 1 and the insulating layer 2 can be continually brought into contact with and rubbed against each other, thereby generating electricity power. Thus, the triboelectrification device according to the embodiment of the present invention may be convenient in use. Especially when the triboelectrification device according to the embodiment of the present invention is applied to some mobile apparatus including for example a liquid crystal display or the like, it can achieve conversion and utilization of energy by slightly shaking the mobile apparatus. The triboelectrification device thus has outstanding advantages in practice.

As shown in FIG. 3, in an embodiment of the present invention, the elastomer 4 is in a shape of a trapezoid or a column.

In the embodiment of the present invention, the shape of the elastomer 4 is not limited, and the elastomer 4 may be in the shape of a trapezoid or a column, or may be in the shape of a long bar that is integrally disposed throughout between the electrode layer 1 and the metal layer so long as supporting and springing back of the electrode layer 1 or the metal layer 3 is achieved.

A process of manufacturing the triboelectrification device according to the embodiment of the present invention belongs to routine processes, and includes coating, exposing, and developing processes. Specifically, the photoresist is coated on a substrate by spin coating, and then a vacuum chemical vapor deposition (CVD) process is performed. The process further includes vacuum drying and pre-baking processing. A thickness of the photoresist is controlled in a range from 5 μm to 40 μm. Violet light is then provided to irradiate the coated photoresist with a mask. During experiment process, a negative photoresist is used for forming a color film, and an unexposed portion of the negative photoresist will be dissolved during development.

Figure 4:
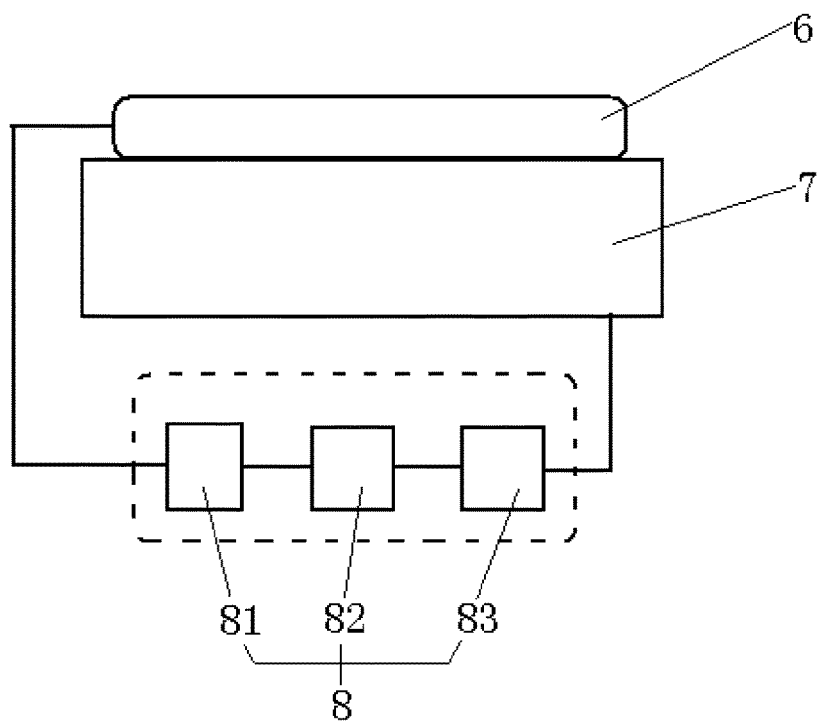
FIG. 4 is a schematic view of a display device according to a still another embodiment of the present invention.

As shown in FIG. 4, embodiments of the present invention provide a display device comprising a triboelectrification device 6, a display panel body 7 and a power supply 8, the triboelectrification device 6 being arranged at a side of the display panel body 7 and the triboelectrification device 6, the power supply 8 and the display panel body 7 are electrically connected in sequence.

In the embodiment of the present invention, by integrating the triboelectrification device 6 described in the above embodiments into the display panel body 7, energy generated by common friction is converted into electric energy and is transported to the power supply 8 to be stored, which can be fed to the display panel body 7 to be used at any moment when needed. In such a way, an auxiliary power source or a charging device can be provided to the display apparatus so that usage time of a battery of the apparatus after one charge is prolonged and energy is greatly saved. The power supply 8 generally includes a connection component 81, a voltage dropping and regulating circuit 82, and a battery 83, wherein the charges collected from the triboelectrification device 6 is transferred, via the connection component 81 and the voltage dropping and regulating circuit 82, to the battery 83 to be stored.

In the display device according to the embodiment, the electrode layer 1 is pressed and the elastomer 4 is compressed under the pressure force such that the electrode layer 1 and the insulating layer 2 are brought into contact with each other to be rubbed against each other. Further, the elastomer 4 springs back to enable the electrode layer 1 to be separated from the insulating layer 2. As this process is repeated, the electrode layer 1 and the insulating layer 2 can be repeatedly brought into contact with each other to be rubbed against each other time after time such that positive and negative charges are continually generated on the metal layer 3, which contacts the insulating layer 2, and the electrode layer 1 respectively. The positive and negative charges can be directly led out to be used as an energy source, thereby achieving conversion of energy generated by friction into electric energy and avoiding energy waste. Further, the device according to the embodiment has a simply structure and can be manufactured at low cost.

In addition, the triboelectrification device according to the embodiments of the present invention may also be combined with a panel device such as a watch, mobile phone and display, and the triboelectrification device can supply energy to an apparatus such as a wearable display. It may be used widely.

The above embodiments are preferred embodiments of the present invention and are not intend to limit the present invention. It would be appreciated by those skilled in the art that all of changes and modifications made within principles and spirit of the present invention should be included within the scope of the present invention.

The invention claimed is:

1. A triboelectrification device comprising:
a plurality of layered electricity generating assemblies that are stacked, the layered electricity generating assemblies each comprising an electrode layer, an insulating layer, a metal layer and an elastomer; and
an insulating separation layer arranged between every two layered electricity generating assemblies that are stacked, the insulating separation layer comprising an insulating housing and a balance weight which is arranged within the insulating housing;
wherein the electrode layer, the insulating layer, and the metal layer are arranged in sequence from above downwards in each of the layered electricity generating assemblies, the insulating layer is in contact with the metal layer, the elastomer couples the electrode layer with the metal layer, is supported between the electrode layer and the insulating separation layer and is located at at least one side of the insulating layer.

2. The triboelectrification device as claimed in claim 1, wherein the elastomer is made of an elastic resin material.

3. The triboelectrification device as claimed in claim 2, wherein the elastomer comprises a photoresist material.

4. The triboelectrification device as claimed in claim 3, wherein the photoresist material comprises 50%~90% solvent, 5%~20% monomer, 0.1%~2% dispersant and 0.1%~5% initiator.

5. The triboelectrification device as claimed in claim 4, wherein the photoresist material further comprises at least one of an acrylic particle and an inorganic filler particle.

6. The triboelectrification device as claimed in claim 5, wherein the inorganic filler particle comprises a particle of calcium carbonate with a particle size of 1~11 μm, a particle of superfine ceramic with a particle size of 0.09 μm, or a silicon ball with a particle size of 3~10 μm.

7. The triboelectrification device as claimed in claim 1, wherein metal layers of adjacent electricity generating assemblies are arranged to be close to each other and the insulating separation layer isolates them from each other.

8. The triboelectrification device as claimed in claim 1, wherein the elastomer is in a shape of a trapezoid or a column.

9. The triboelectrification device as claimed in claim 1, wherein:
metal layers of the two layered electricity generating assemblies are arranged at two sides of the insulating separation layer; and
the elastomer couples the electrode layer with the insulating separation layer, is supported between the electrode layer and the insulating separation layer and is located at at least one side of the insulating layer.

10. A display device comprising the triboelectrification device as claimed in claim 1, a display panel body and a power supply, the triboelectrification device being arranged at a side of the display panel body and the triboelectrification device, the power supply and the display panel body are electrically connected in sequence.

11. The display device as claimed in claim 10, wherein the power supply is configured to store electrical energy generated by the triboelectrification device.

12. The triboelectrification device as claimed in claim 1, wherein the elastomer has a height over an upper surface of the insulating layer such the electrode layer has no contact with the insulating layer.

13. The triboelectrification device as claimed in claim 12, wherein the elastomer is configured to be deformable to allow contact and friction between the electrode layer and the insulating layer and be resilient such that the electrode layer is separated from the insulating layer.

14. The triboelectrification device as claimed in claim 1, wherein the balance weight is a metal block.

15. The triboelectrification device as claimed in claim 1, wherein the insulating separation layer is configured to allow the balance weight to press the metal layer or the electrode layer due to its movement resulting contact and friction between the electrode layer and the insulating layer.

16. The triboelectrification device as claimed in claim 1, wherein electrode layers of two adjacent electricity generating assemblies are arranged to be close to each other and the insulating separation layer isolates them from each other.

17. The triboelectrification device as claimed in claim 1, wherein the electrode layer and metal layer of two adjacent electricity generating assemblies respectively are arranged to be close to each other and the insulating separation layer isolates them from each other.

* * * * *